March 12, 1957 H. O. HILL ET AL 2,784,708
FUEL PUMP
Filed Nov. 18, 1950 11 Sheets-Sheet 7
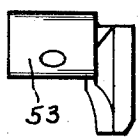
Fig.14
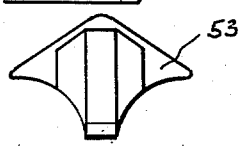
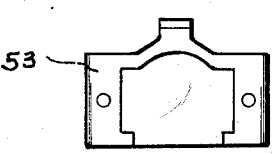
Fig.13
Fig.15
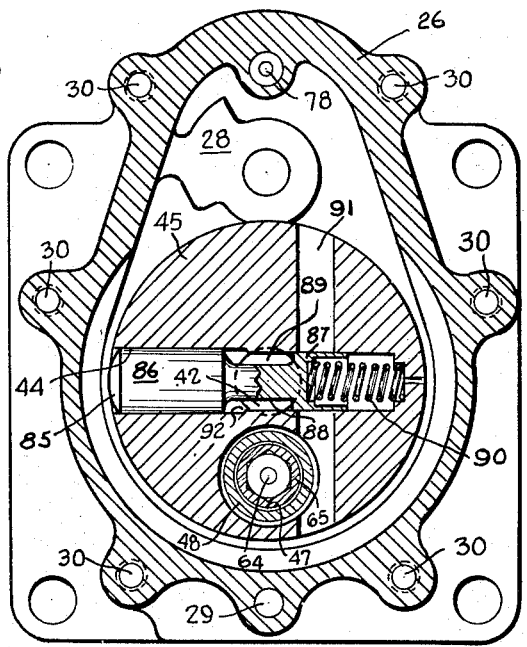
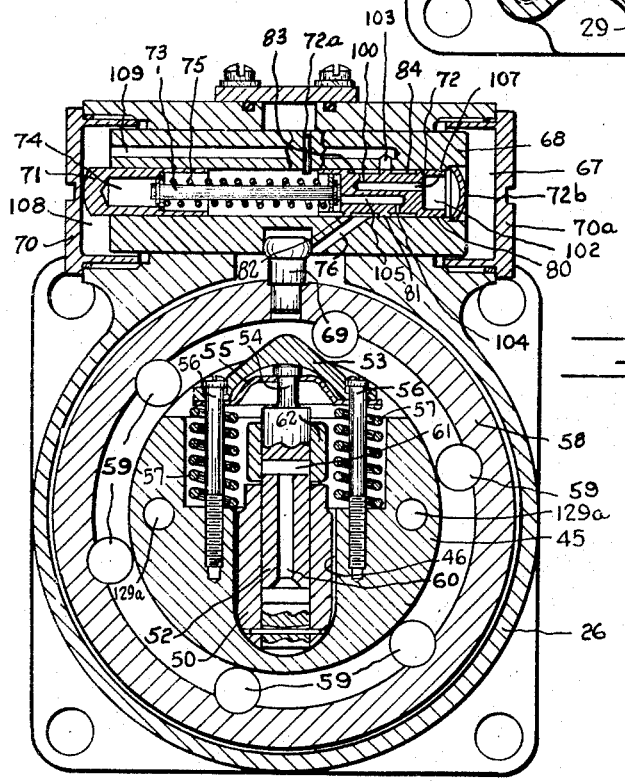
Fig.10
Fig. 9
Inventors.
HARRY O. HILL
ROBERT S. JOHNSON
Raymond A. Paquin
Attorney March 12, 1957

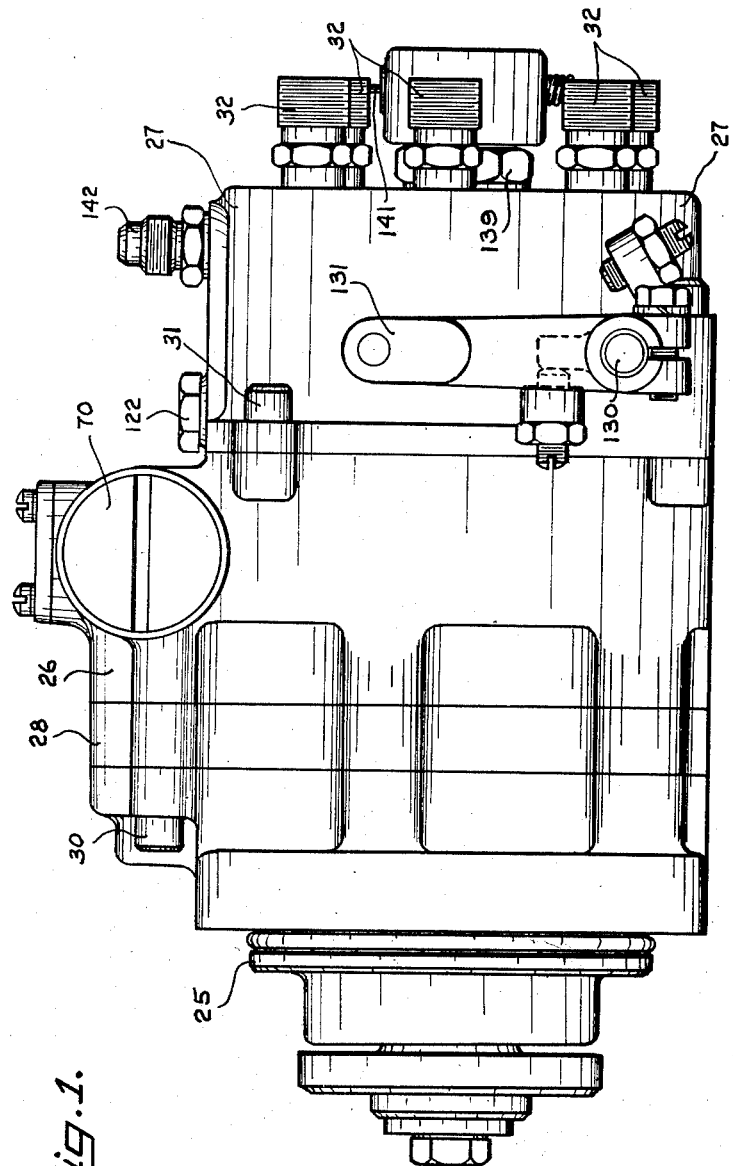

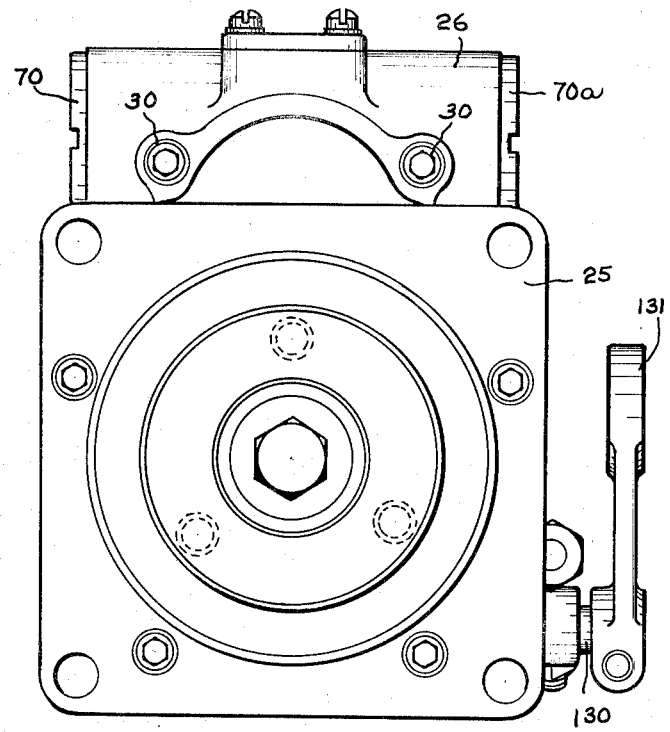
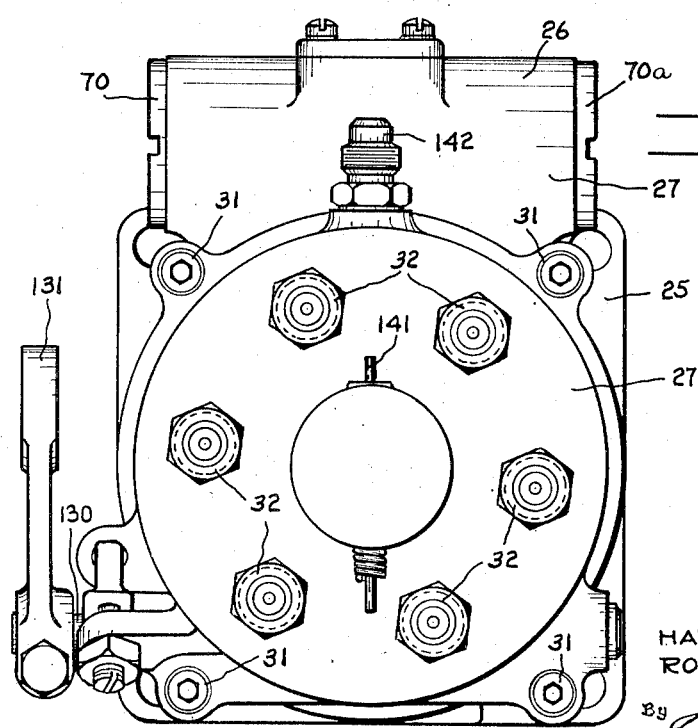

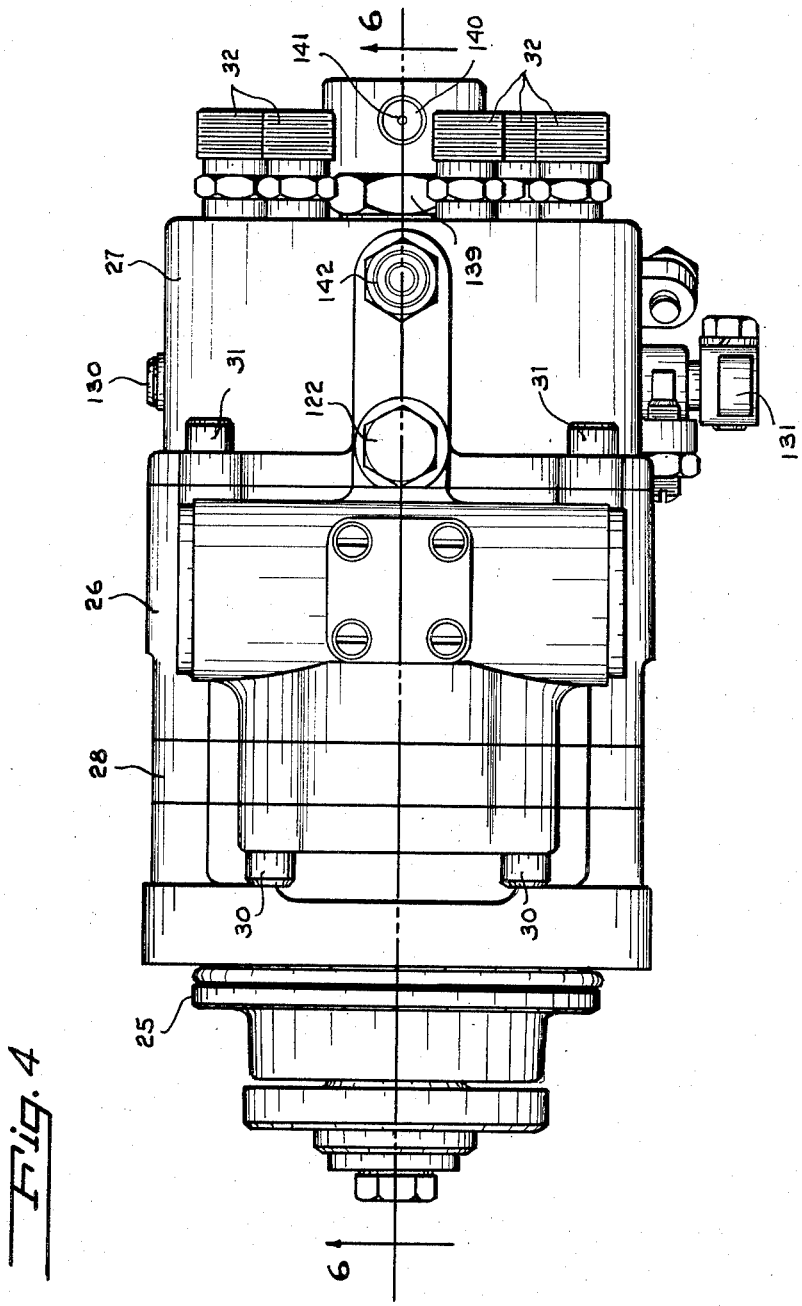

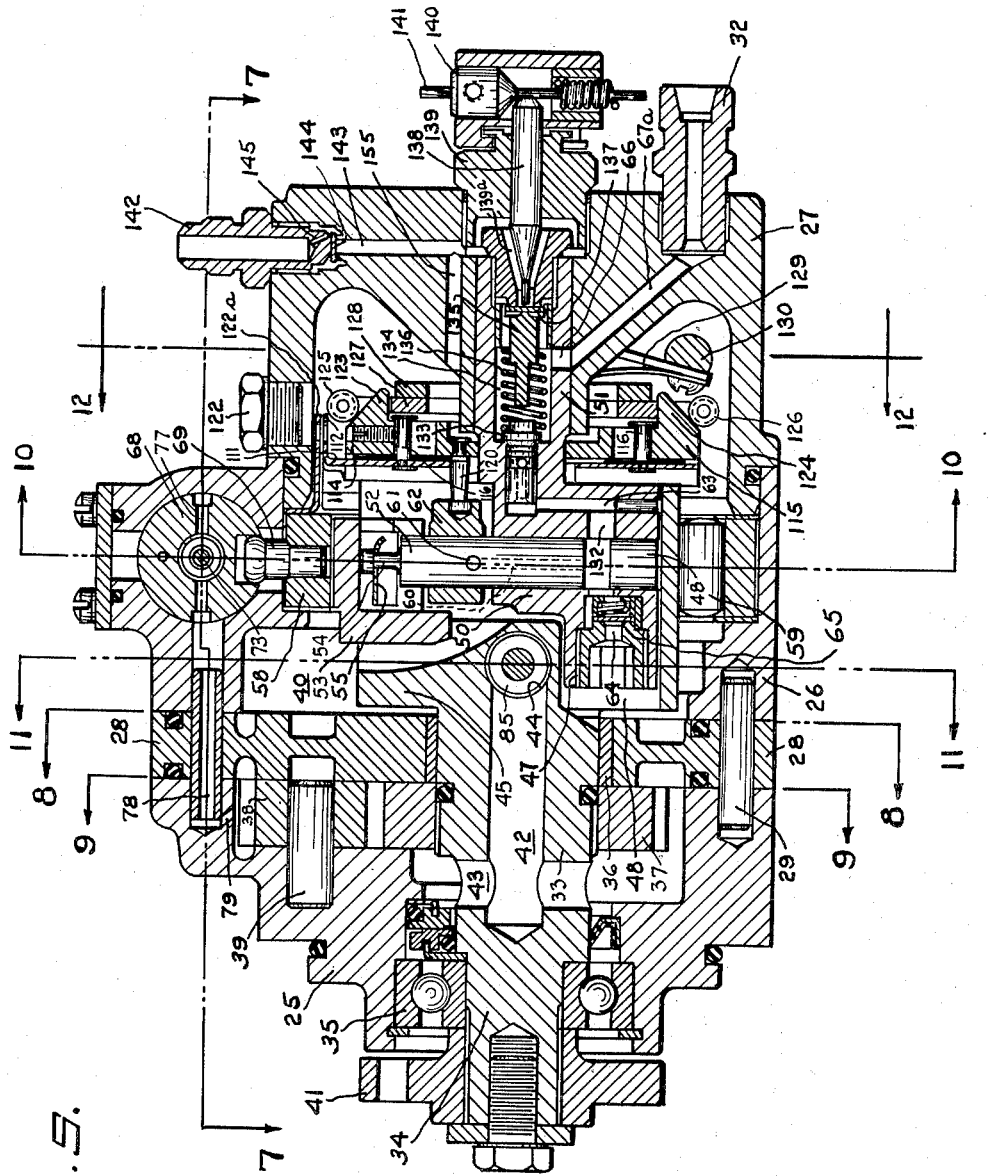

H. O. HILL ET AL 2,784,708

FUEL PUMP

Filed Nov. 18, 1950

Inventors.
HARRY O. HILL
ROBERT S. JOHNSON

By Raymond A. Paquin

Attorney

March 12, 1957
H. O. HILL ET AL
2,784,708
FUEL PUMP
Filed Nov. 18, 1950
11 Sheets-Sheet 9
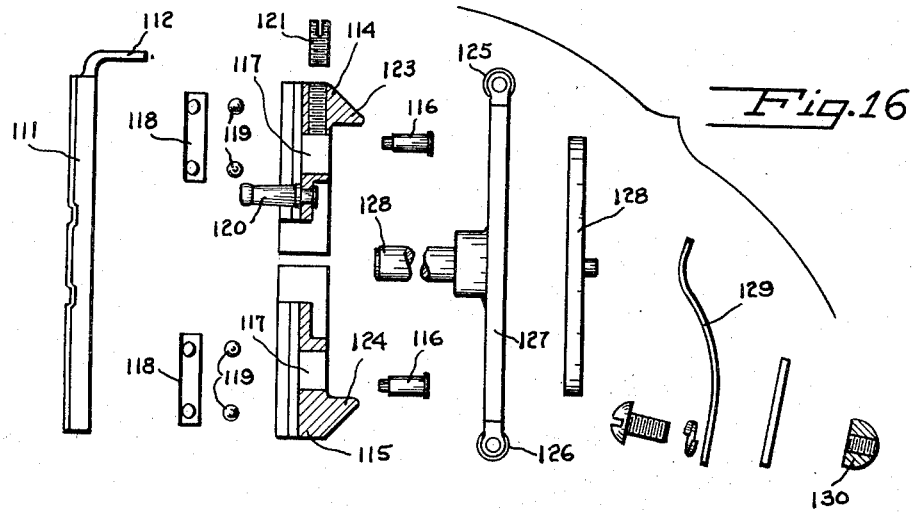
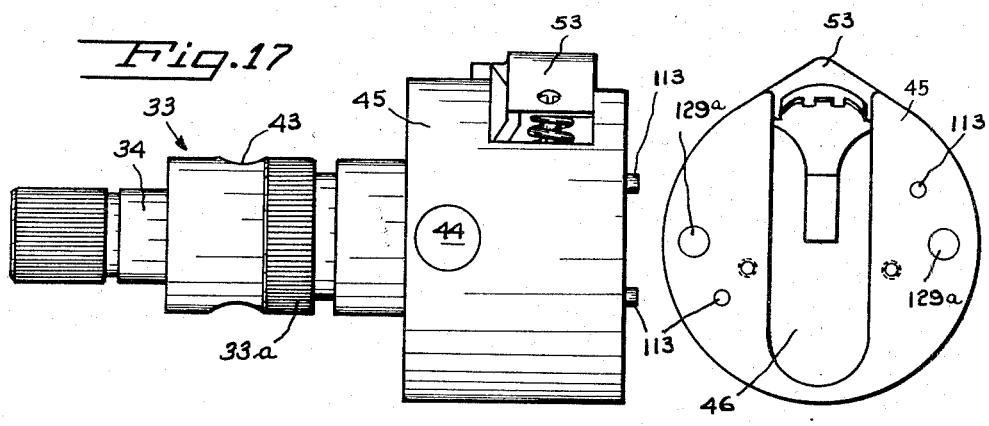
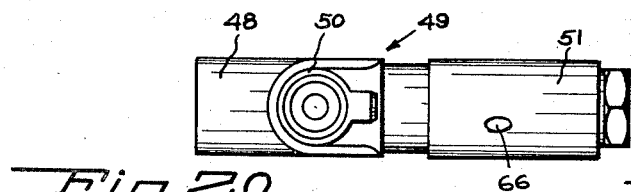
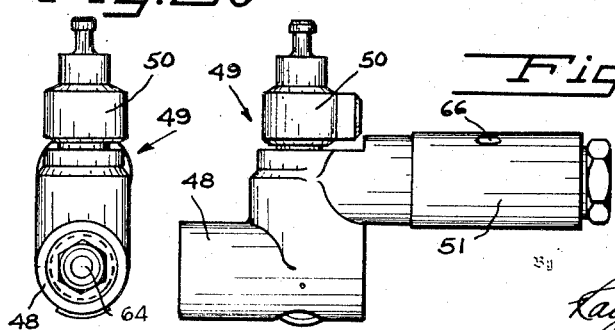
Inventors.
HARRY O. HILL
ROBERT S. JOHNSON
By Raymond A. Paquin
Attorney March 12, 1957  H. O. HILL ET AL  2,784,708
FUEL PUMP
Filed Nov. 18, 1950  11 Sheets-Sheet 11
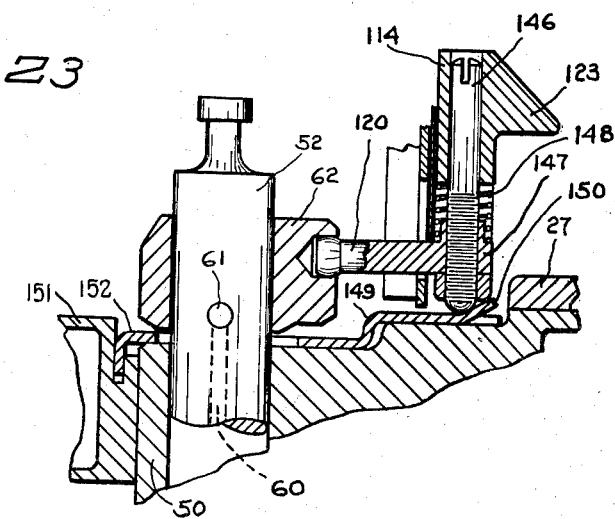
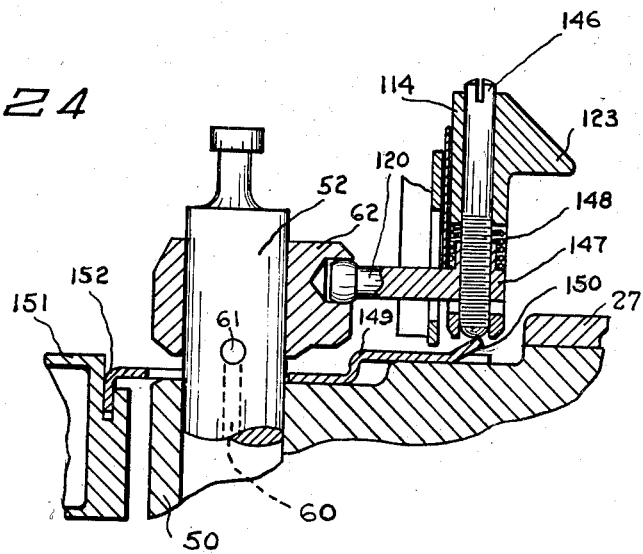
Inventors
HARRY O. HILL
ROBERT S. JOHNSON
By
Raymond A. Paquin
Attorney

United States Patent Office 2,784,708
Patented Mar. 12, 1957

2,784,708

FUEL PUMP

Harry O. Hill, Lansing, and Robert S. Johnson, Lake Odessa, Mich., assignors to American Bosch Arma Corporation, a corporation of New York Application November 18, 1950, Serial No. 196,484

5 Claims. (Cl. 123—139)

This invention relates to new and improved means for supplying, injecting and distributing fuel to the combustion chambers of a combustion device such as the cylinders of an internal combustion engine or the like and has particular reference to the provision of such a device which is relatively compact and economical in construction and efficient in operation.

An object of the invention is to provide a new and improved apparatus for supplying fuel to the combustion chambers of a combustion device.

Another object is to provide a new and improved apparatus for pumping, injecting and distributing fuel to the various combustion chambers of a combustion device.

Another object is to provide such a new and improved apparatus which includes fuel supply and fuel injection pumps and a fuel distributor.

Another object is to provide a new and improved apparatus of the type set forth wherein the fuel supply and fuel injection pumps and the fuel distributor are all embodied in a relatively compact and economical unit.

Another object is to provide a new and improved fuel injection and distributing apparatus wherein a single pumping member and control and single inlet and delivery or discharge valves are employed for supplying fuel to a plurality of combustion chambers.

Another object is to provide a fuel distributing means and method for a device of the type set forth which does not require a pumping plunger of large diameter but which yet provides a sufficient amount of sealing area between the various distributing outlets.

Another object is to provide a device of the type set forth wherein the fuel distributor is independent of the fuel pumping member which allows the use of a pumping member of desired size without interfering with distribution or the sealing area between the various distributing outlets.

Another object is to provide a relatively simple arrangement for automatically controlling the timing of injection in accordance with the engine requirements.

Another object is to provide a relatively simple, yet accurate, governor for a fuel injection pump for controlling the fuel and thereby controlling engine speed.

Another object is to provide a new and improved device for control of engine torque.

Another object is to provide a new and improved hydraulic type torque control.

Another object is to provide a built in low pressure fuel supply for a fuel injection pump.

Another object is to provide a mechanism for actuating the pumping member or plunger of a fuel injection pump wherein only a single accurately formed cam is required.

Another object is to provide a new and improved arrangement for positively shutting down the pump and engine.

Another object is to provide a device of the type set forth wherein the entire fuel supply pump, fuel injection pump, governor and distributor are positioned within the liquid pumped and distributed thereby, such as fuel oil, under pressure, which both lubricates and cools the same.

Other objects and advantages of the invention will be apparent from the following description taken in connection with the accompanying drawings. It will be understood that changes may be made in the details of construction and arrangement of parts shown and described as the preferred form has been given by way of illustration only.

Referring to the drawings:

Fig. 1 is a side view of an apparatus embodying the invention;

Fig. 2 is an end view thereof from the drive end;

Fig. 3 is an end view thereof from the end opposite the drive end;

Fig. 4 is a top or plan view thereof;

Fig. 5 is a sectional view taken on line 6—6 of Fig. 4, looking in the direction of the arrows;

Fig. 9 is a sectional view taken on line 10—10 of Fig. 5, looking in the direction of the arrows;

Fig. 10 is a sectional view taken on line 11—11 of Fig. 5, looking in the direction of the arrows;

Figs. 13, 14 and 15 are views showing the side, front and top, respectively, of the cam for actuating the pumping member;

Fig. 16 is an exploded view showing the governor elements;

Fig. 17 is a side view showing the drive shaft and cam assembly;

Fig. 18 is an end view of the drive shaft and cam assembly shown in Fig. 17;

Figs. 19, 20 and 21 are top, end and side views, respectively, of the pumping and distributing members;

Fig. 23 is a fragmentary view, on an enlarged scale, showing the torque control mechanism in low speed position; and Fig. 24 is a view similar to Fig. 23 showing the torque control mechanism in high speed position.

Figure 6:
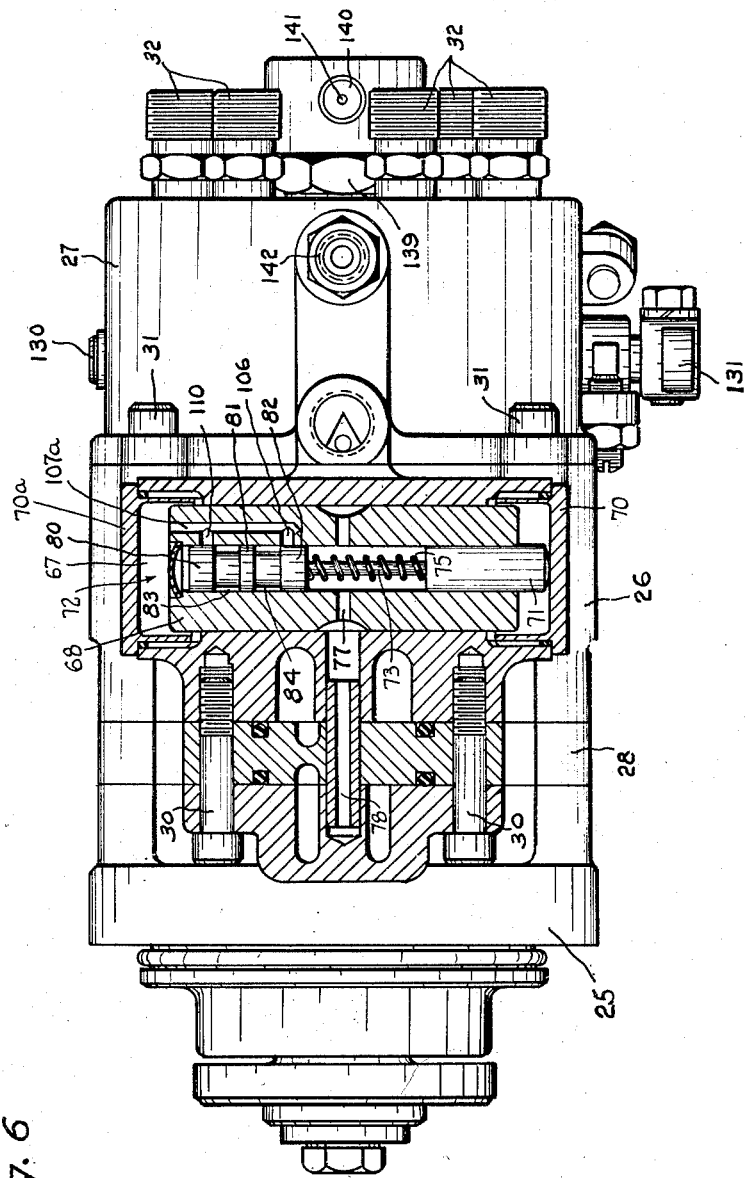
Fig. 6 is a sectional view taken on line 7—7 of Fig. 5, looking in the direction of the arrows.

Referring more particularly to the drawings wherein similar characters designate corresponding parts throughout, the form of the invention shown comprises a supply pump housing section 25, injection pump housing section 26 and governor housing section 27 with an intermediate section 28 positioned between supply pump housing section 25 and injection pump housing section 26. Aligning pin 29 is provided for properly aligning sections 25, 26 and 28 and these sections are secured together in such aligned relation by bolts 30 and governor housing section is secured in position on the opposite side of injection pump housing section 26 by means of bolts 31. Section 28 is preferably made reversible, that is, so that the pump can be adapted to be operated in desired direction.

For the purpose of illustrating the invention, it has been shown embodied in a unit adapted to supply fuel to a combustion device having six combustion chambers, for example, a six cylinder engine, but it is capable of being adapted to units for supplying fuel to combustion devices or engines having other than six combustion chambers or cylinders, for example, two, four or other desired number.

Also, as shown, the device is intended for operation at cam shaft speed. It will be understood that the device may be adapted to operate at other than cam shaft speed by the provision of suitable gear arrangements.

Governor housing section 27 is provided with a plurality of outlets 32, one of which is adapted to deliver fuel to a combustion chamber or engine cylinder and therefore in the embodiment shown, six such outlets are provided as hereinafter described.

Within aligned openings in supply pump housing section 25, intermediate section 28 and injection pump housing section 26 is positioned a rotor or member designated generally at 33 as shown particularly in Figs. 6 and 18 and which consists of a drive shaft portion 34 which is journaled in ball bearing 35 in supply pump housing 25 and in plain bearing 36 which is pressed into intermediate section 28.

On a splined or serrated portion 33a of this member 33 is positioned gear 37 of a gear pump composed of gear 37 and gear 38 which is positioned on shaft or pin 39 which is pressed into an opening in supply pump housing section 25 and gears 37 and 38 mesh to form a supply pump as shown to receive fuel under pressure from a supply tank and increase the pressure of such fuel and deliver such fuel at such increased pressure to a sump 40 in the interior of the injection pump housing section 26 and governor housing section 27 through passage 42 as controlled by pressure regulating valve 85.

Drive shaft portion 34 of rotor member 33 is provided with hub drive 41 adapted to be secured to the driving gear of the engine with which the device is employed by being bolted thereto by bolts extending through openings in said hub drive 41.

Within said member 33 is the axial groove 42 at the opposite ends of which are the transverse openings 43 and 44 which openings are at right angles relative to each other.

Figure 22:
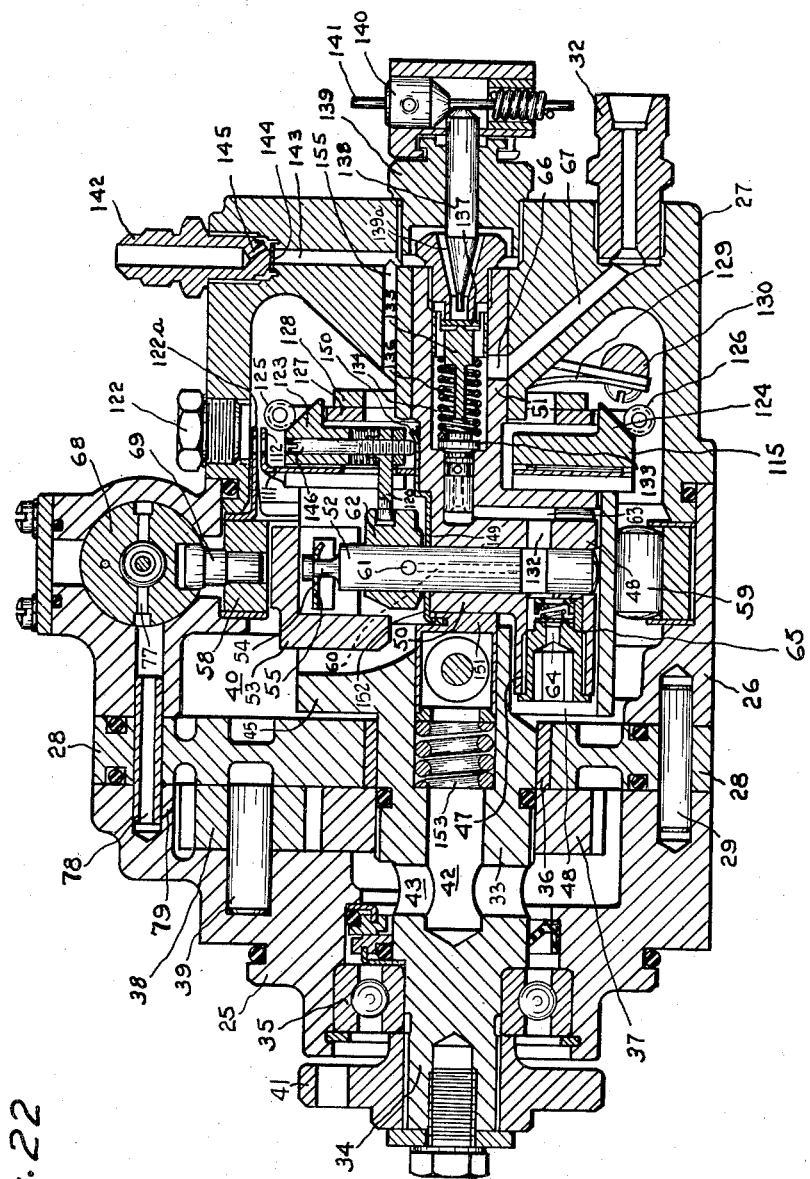
Fig. 22 is a sectional view, similar to Fig. 5, showing the pump embodying a torque control.

Opening 44 is formed in cam housing or injection pump portion 45 of rotor member 33, which portion is of greater diameter than the remainder of member 33 and said portion 45 is provided with the U-shaped slot or cut out 46 and the opening 47 adjacent its lower end which opening is preferably parallel with the axis of member 33 but spaced from said axis and is adapted to receive the end 48 of the member shown in Figs. 20, 21 and 22 which is designated generally at 49 and which consists of the plunger barrel portion 50 and governor barrel section 51 as well as end portion 48. In this manner shaft 34 is operatively connected to the pumping and distributing members to drive the same.

Within plunger barrel portion 50 is mounted the pumping member or plunger 52 which is adapted to be reciprocated within said barrel 50 for pumping fuel by means of cam 53 and the adjacent end 54 of plunger 52 is retained in engagement with said cam 53 by spring retainer 55, as shown in Fig. 10 and cam 53 is mounted for sliding movement on bolts 56 and is adapted to be returned by coil springs 57 on bolts 56.

Within injection pump housing section 26 is positioned ring 58 on the inner side of which are provided the cam rollers 59 of such number and spacing as the desired injections or strokes of plunger 52 and said plunger is adapted to pump each time said cam actuated member 53 engages one of said cam rollers 59 during the rotation of shaft 34 and member 45 which rotate bodily within injection pump housing section 26.

Plunger 52 is provided with the opening 60 and the spill port 61, the spill of which is controlled by control sleeve 62 which may be adjusted as hereinafter described to control the quantity of fuel spilled and hence the quantity of fuel delivered by the pump.

Fuel is supplied the plunger bore through passageway 64 and fuel inlet valve 65.

Fuel pumped by plunger 52 passes through passageway 132 to passageway 63 and therethrough past discharge or delivery valve 133 to chamber 134 in governor barrel section 51 which has the opening 66 adapted to be aligned with each of the passageways 67a, one of which is provided for each of the outlets 32 and each of which is adapted to supply fuel to its respective outlet 32.

Figure 7:
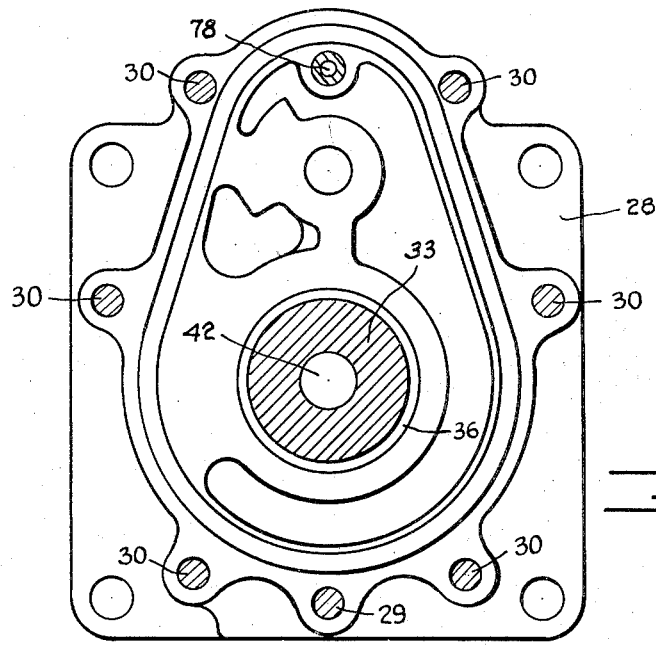
Fig. 7 is a sectional view taken on line 8—8 of Fig. 5, looking in the direction of the arrows.
Figure 8:
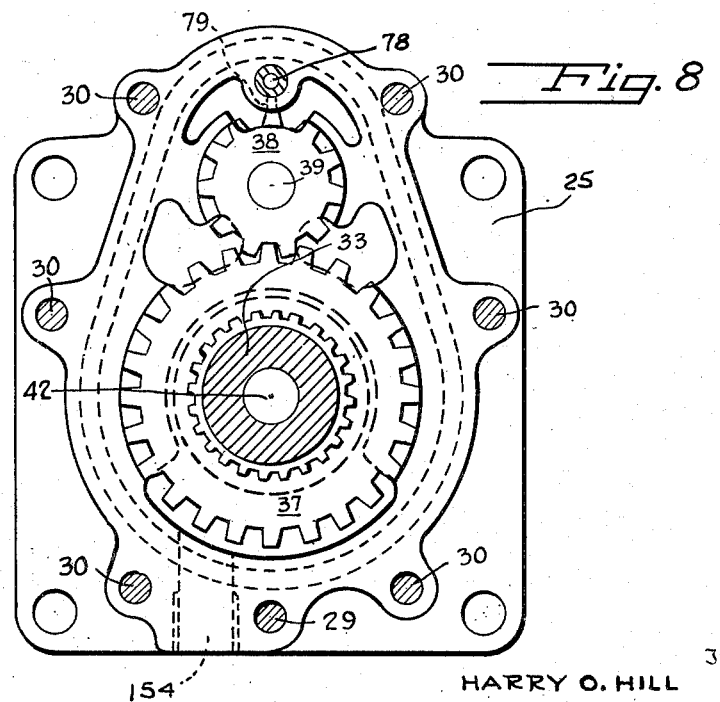
Fig. 8 is a sectional view taken on line 9—9 of Fig. 5, looking in the direction of the arrows.
Figure 12:
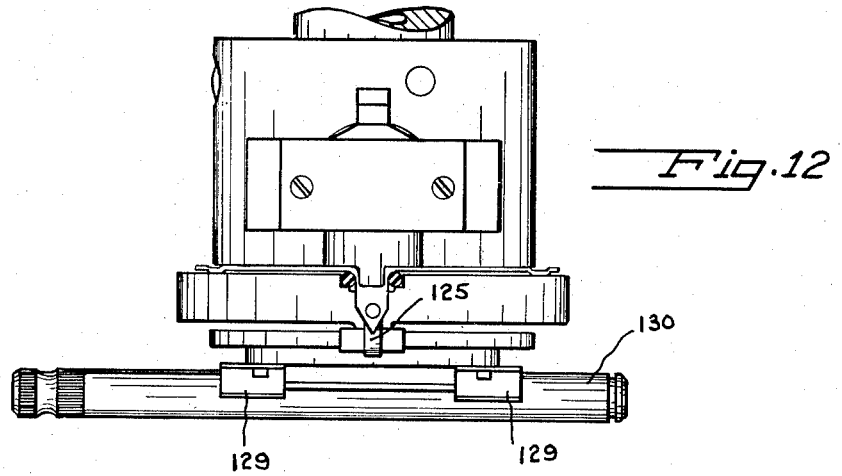
Fig. 12 is a fragmentary view showing the disposition of the governor parts.

The automatic, hydraulically operated timing control as shown particularly in Figs. 7 and 10 consists of the transverse slideway 67 in which is mounted the slide 68 mounted for reciprocating sliding movement in said slideway and keyed to the pin 69 which is also keyed to ring 58 whereby any sliding movement of slide 68 will be transmitted through pin 69 to ring 58 to partially rotate ring 58 and therey change the position of cam rollers 59 and thereby change the time of action of cam 53 by said rollers 59 and thus change the timing of the pumping strokes of plunger 52 to correspondingly change the time of injections by the pump.

Slideway 67 is closed at its opposite ends by caps 70 and 70a and slide 68 is provided with an axial opening in the opposite ends of which are positioned the spaced sliding members 71 and 72 which are retained in spaced relation by rod 73 adapted to enter bore 74 in member 71 and on which is positioned coil spring 75 which normally retains said rod out of said bore 74 and said members 71 and 72 in spaced relation except when the force of said spring 75 is overcome by hydraulic force of fluid passing through passageway 76 as pressure in the pump sump increases and this fuel actuates pilot valve 72 and then fuel is admitted behind the end of said valve and hydraulically locks said valve in its new position. It will be noted that the timing of injection by the pump is a direct function of speed.

Pin 72a limits the movement of pilot valve 72 in one direction and closure 72b limits its movement in the opposite direction.

Fuel reaching pilot valve 72 passes through passageway 77 to passageway 78 from which it passes through opening 79 back to the supply side of the supply pump.

Pilot valve 72 is provided with spaced land portions 80, 81 and 82 separated by the reduced circumferential grooves 83 and 84 as shown in Fig. 7.

Figure 11:
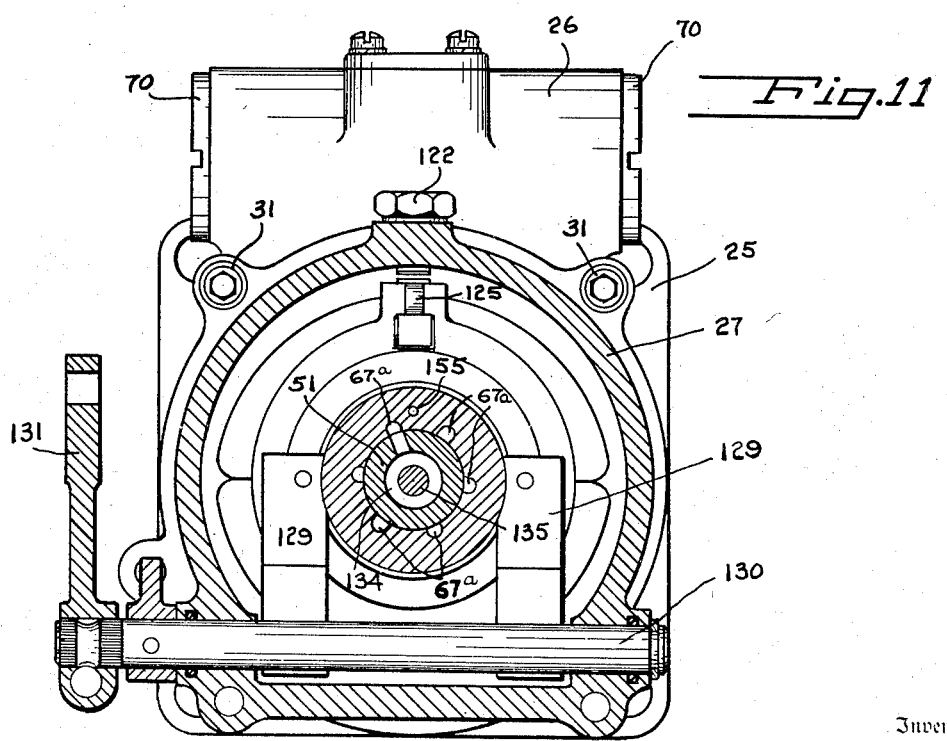
Fig. 11 is a sectional view taken on line 12—12 of Fig. 5, looking in the direction of the arrows.

The chamber formed by the interior of the injection pump housing and governor housing are filled with fuel at the pressure delivered by the gear supply pump, as previously described and the supply pump is sealed from said chamber and centrifugally operated valve 85, shown particularly in Fig. 11, is provided in opening 44 for controlling said pressure. This fuel pressure in the sump or housing is high at high pump operating speeds and low at low pump operating speeds, that is, such fuel pressure is always proportional to the speed of the pump.

Centrifugally operated valve 85 is a centrifugal pressure control for regulating the pressure in the pump sump. This valve comprises the sliding weighted end 86 and valve portion 87 separated by groove 88 with said valve mounted in cross slide 89. Coil spring 90 retains said member 85 in desired position with valve portion 87 normally closing the passage of fuel from the pump sump through passageway 91.

Shoulder 92 acts as a limiting stop for valve member 85.

Centrifugal pressure tends to keep valve 85 closed, as shown in Fig. 11, and as fluid pressure from the gear supply pump on the end of weighted end 86 is greater than the pressure in the pump sump and the force of spring 90 moves the valve 85 and thereby opens valve portion 87, fuel passes from channel 91 to channel 42 as previously described.

Fuel passing under pressure through passageway 76 and annular groove 83 will pass through restricted opening 100 to passageway 107 from which it passes into the chamber 102 behind pilot valve 72 and pressure of this fuel forces said pilot valve against the action of spring 75 until annular groove 84 is in communication with passageway 103 which then, through restricted opening 104 places said passageway 103 in communication with the low pressure side of pilot valve 72 thorugh passageway 105 which allows fuel to flow to the opposite side of the valve to balance the pressure on the ends of the valve.

While this is taking place land 82 of pilot valve 72 uncovers passageway 106 and allows fuel to pass through passageway 107a to chamber 67 and then force servo piston 68 in a direction away from cap 70 to alter the timing of the pump. When the speed of the pump is reduced then pressure in passage 76 drops and spring 75 forces pilot valve 72 in a direction toward cap 70 and then port 103 is uncovered and communicates with passageway 76 through annular groove 83 which places passage 76 in communication with chamber 108 through passage 109 and builds up pressure in said chamber 108 and at the same time land 82 closes passage 106 and land 80 uncovers passage 110 and allows fuel to pass from chamber 67 through said passage 110 and restricted opening 104 and passage 105 to the low pressure side of the valve.

The governor arrangement as shown particularly in Figs. 6 and 17 comprises the backing member or plate 111 having the timing indicator 122a thereon adapted to be aligned with pointer 112 on ring 58 to time the pump. The plate 111 is adapted to be supported on cam housing 45 by driving lugs 113 which rotate said backing plate 111. The sliding centrifugal weights 114 and 115 are slidably mounted on backing plate 111 by means of rivets 116, each of which extends through a slot 117 in one of weight members 114 and 115 and secures the weight in operative position on the backing plate 111. The ball race 118 and balls 119 are provided to reduce friction between plate 111 and weights 114 and 115. Weight 114 has the pin or lug 120 which is connected at its opposite end to sleeve 62 for controlling the spilling of fuel from spill port 61 in plunger 52 as previously described. Weight 114 is also provided with the screw or threaded member 121 adapted to control the setting of weight 114 and thus control the maximum quantity of the pump. This screw may be adjusted by removing plug 122 and inserting a screw driver into the pump housing and through aligned openings in indicator 122a and pointer 112.

Each of the weights 114 and 115 are provided with the tapered projecting portions 123 and 124 respectively adapted to cooperatively function with rollers 125 and 126 on roller plate 127 which has pins adapted to fit into the openings 129a in cam housing 45 and said plate 127 is retained in position by thrust washer 128 which in turn is retained in position by leaf springs 129 secured on shaft 130 which is controlled through lever 131 to control the setting of the pump.

When the centrifugal weights 114 are thrown outwardly by centrifugal force upon rotation thereof, the tapered projections 123 and 124 ride upon the rollers 125 and 126 and the extent of movement of said weights is controlled by the force applied against plate 127 by thrust washer 128 through lever 131, shaft 130 and springs 129.

Fuel pumped by plunger 52 passes through passageway 132, past check valve 133 into chamber 134 from which it passes through opening 66 to each of the outlets 67a upon rotation of barrel 51 within which is chamber 134. Within said chamber 134 is member 135 which is both a spring guide for delivery valve spring 136 and a stop for delivery or check valve 133.

To shut off the pump or prevent its delivering fuel, a disc valve 139a is provided adjacent a movable valve control member 138 which extends through an opening in plug 139 and said valve control member 138 is adapted to be actuated by member 140 on wire 141 and said member 140 and the adjacent end of valve control member 138 have cooperating tapered or cam surfaces whereupon movement of wire 141 and member 140, which is secured thereto will cause member 140 to open valve 137 to bypass fuel through passage 143 and also through hole 155 past resilient valve 144 and through restricted opening 145 to return outlet 142 from which it returns to the supply tank.

In Figs. 24, 25 and 26 is shown a form of the invention generally similar to that shown in Fig. 6, but embodying a torque control arrangement, that is, an arrangement wherein a slight additional amount of fuel is supplied to the engine at any throttle position, when the load is sufficient to cause a slowing down of engine speed, and this additional fuel is provided whereby the engine has greater "lugging" power under such conditions.

In this construction, a longer screw 146 is provided instead of screw 114 and on the end of said screw 146 is secured a threaded member 147 to which is secured the pin 120 connecting sleeve 62 for controlling fuel quantity, and a spring 148 is provided between weight 123 and threaded member 147 whereby screw 146 and pin 120 are resiliently mounted relative to weight 123.

Torque control cam member 149 is provided, as shown in Figs. 24, 25 and 26, having an opening through which extends plunger 52 and having one end positioned in a slot in member 45 and having the deflected end portion 150 adapted to engage the lower end of screw 146 at high speed position as shown in Fig. 26, and whereby when the governor weight 123 is in full quantity position at low speed any increase in speed results in a higher differential pressure across torque control piston 151 to which the end 152 of torque control cam 149 is connected and which piston is spring loaded by spring 153 causing it to move cam 149 to left, to position shown in Fig. 26. This forces sleeve 62 to move outwardly toward position of lower fuel quantity by allowing the bypassing of a greater fuel quantity and therefore injection of a smaller quantity.

The torque control cam 149 does not override the governor speed control spring to do this but only the small fixed spring 148 shown.

In operation, the supply pump portion of the apparatus receives fuel from a supply tank under supply pressure through fuel inlet 154 from which it passes to the gear supply pump comprising gears 37 and 38 which pump the fuel under higher pressure and supply such fuel to the fuel injection section of the housing through passageway 64 and inlet valve 65 and the fuel injection section is at all times filled with fuel under pressure from the supply pump and surplus fuel not delivered to the distributor is bypassed through passages 155 and 143 and bypass outlet 142 which returns such surplus fuel to the fuel supply tank. In addition, when safety shut-off valve 138 is adjusted so as to prevent delivery by the pump to the engine, any fuel reaching distributing chamber 134 is bypassed through passage 143 to outlet 142 and hole 155 as previously described.

As shaft 34 is rotated, the gear pump is operated and cam housing 45 carrying fuel injection plunger 52 is rotated which bodily rotates the plunger and during such rotation, cam follower 53 successively engages each of the cam rollers 59 each of which effects a pumping stroke of plunger 52.

Fuel delivered by the plunger under injection pressure passes through passageway 132 and check valve 133 to distributing chamber 134 which is simultaneously rotated about its axis upon rotation of cam housing 45 and said chamber 134 has its port 66 successively aligned with each of the outlet ports 67a to provide fuel through each of the outlets 32 to a combustion chamber to which such outlets are connected.

The quantity of fuel delivered by plunger 52 is controlled by sleeve 62 which controls the spill through spill passage 60 and spill port 61 in plunger 52, which sleeve 62 is automatically controlled by the governor as previously described. As shown in Fig. 10, the passageway or longitudinal hole 60 in plunger 52 and which hole connects with spill port 61 permits fuel to be spilled from the pumping chamber above the plunger to thereby control the quantity of fuel delivered.

From the foregoing it will be seen that we have provided simple, efficient and economical means for obtaining all of the objects and advantages of the invention.

Having described our invention, we claim:

1. In a device of the character described, a housing, a rotor mounted for rotation in said housing, said rotor having a transverse bore, piston means in said bore, cam means surrounding said rotor and adapted to engage said pumping member upon rotation of said rotor for effecting reciprocation of said pumping member in said bore upon rotation of said rotor, said rotor having a distributing portion and a fuel passage connecting said pumping member with said distributing portion, said pumping member comprising a plunger having a longitudinal bore and a spill port communicating with said longitudinal bore and an adjustable sleeve surrounding said plunger adjacent said spill port for controlling the quantity of fuel spilled therethrough and thereby controlling the quantity of fuel delivered by the pump and a plurality of outlets adapted to communicate successively with said distributing portion of said rotor upon rotation of said rotor.

2. In a device of the character described, a housing, a rotor mounted for rotation in said housing, said rotor having a transverse bore, piston means in said bore, cam means surrounding said rotor and adapted to engage said pumping member upon rotation of said rotor for effecting reciprocation of said pumping member in said bore upon rotation of said rotor, said rotor having a distributing portion and a fuel passage connecting said pumping member with said distributing portion, said pumping member comprising a plunger having a longitudinal bore and a spill port communicating with said longitudinal bore and an adjustable sleeve surrounding said plunger adjacent said spill port for controlling the quantity of fuel spilled therethrough and thereby controlling the quantity of fuel delivered by the pump and a plurality of outlets adapted to communicate successively with said distributing portion of said rotor upon rotation of said rotor, a hydraulically actuated piston carried by said support, said piston being transversely of said support and adapted to be reciprocated and said piston being operatively connected to said cam actuating means for effecting rotation of said cam actuating means to vary the relationship between said cam actuating means and said pumping member for controlling the timing of the pumping action of said pumping member.

3. In a device of the character described, a housing, a rotor mounted for rotation in said housing, said rotor having a transverse bore, piston means in said bore, cam means surrounding said rotor and adapted to engage said pumping member upon rotation of said rotor for effecting reciprocation of said pumping member in said bore upon rotation of said rotor, said rotor having a distributing portion and a fuel passage connecting said pumping member with said distributing portion, said pumping member comprising a plunger having a longitudinal bore and a spill port communicating with said longitudinal bore and an adjustable sleeve surrounding said plunger adjacent said spill port for controlling the quantity of fuel spilled therethrough and thereby controlling the quantity of fuel delivered by the pump and a plurality of outlets adapted to communicate successively with said distributing portion of said rotor upon rotation of said rotor, a hydraulically actuated piston carried by said support, said piston being transversely of said support and adapted to be reciprocated and said piston being operatively connected to said cam actuating means for effecting rotation of said cam actuating means to vary the relationship between said cam actuating means and said pumping member for controlling the timing of the pumping action of said pumping member and a governor connected to said spill control sleeve for automatically adjusting said sleeve relative to said spill port to automatically control the quantity of fuel injected by the pump.

4. In a device of the character described, a housing, a rotor mounted for rotation in said housing, said rotor having a transverse bore, piston means in said bore, cam means surrounding said rotor and adapted to engage said pumping member upon rotation of said rotor for effecting reciprocation of said pumping member in said bore upon rotation of said rotor, said rotor having a distributing portion and a fuel passage connecting said pumping member with said distributing portion, said pumping member comprising a plunger having a longitudinal bore and a spill port communicating with said longitudinal bore and an adjustable sleeve surrounding said plunger adjacent said spill port for controlling the quantity of fuel spilled therethrough and thereby controlling the quantity of fuel delivered by the pump and a plurality of outlets adapted to communicate successively with said distributing portion of said rotor upon rotation of said rotor, a hydraulically actuated piston carried by said support, said piston being transversely of said support and adapted to be reciprocated and said piston being operatively connected to said cam actuating means for effecting rotation of said cam actuating means to vary the relationship between said cam actuating means and said pumping member for controlling the timing of the pumping action of said pumping member, said governor having means for providing additional fuel upon increased load conditions when said governor is in full quantity position at low speed.

5. In a device of the character described, a housing, a rotor mounted for rotation in said housing, said rotor having a transverse bore, piston means in said bore, cam means surrounding said rotor and adapted to engage said pumping member upon rotation of said rotor for effecting reciprocation of said pumping member in said bore upon rotation of said rotor, said rotor having a distributing portion and a fuel passage connecting said pumping member with said distributing portion, said pumping member comprising a plunger having a longitudinal bore and a spill port communicating with said longitudinal bore and an adjustable sleeve surrounding said plunger adjacent said spill port for controlling the quantity of fuel spilled therethrough and thereby controlling the quantity of fuel delivered by the pump and a plurality of outlets adapted to communicate successively with said distributing portion of said rotor upon rotation of said rotor, a hydraulically actuated piston carried by said support, said piston being transversely of said support and adapted to be reciprocated and said piston being operatively connected to said cam actuating means for effecting rotation of said cam actuating means to vary the relationship between said cam actuating means and said pumping member for controlling the timing of the pumping action of said pumping member, said governor member being a centrifugal governor and having means to provide additional fuel upon increased load conditions when said governor is in full quantity position at low speed.

References Cited in the file of this patent

UNITED STATES PATENTS

| Number | Name | Date |
|---|---|---|
| 1,772,828 | Egersdorfer | Aug. 12, 1930 |
| 2,123,433 | Mayo | July 12, 1938 |
| 2,157,970 | Rowland et al. | May 9, 1939 |
| 2,379,546 | Snader | July 3, 1945 |
| 2,417,183 | Smith | Mar. 11, 1947 |
| 2,455,571 | Edwards | Dec. 7, 1948 |
| 2,462,500 | Hoffer | Feb. 22, 1949 |
| 2,465,784 | Berlyn et al. | Mar. 29, 1949 |
| 2,502,546 | Adams | Apr. 4, 1950 |
| 2,518,473 | Rogerman et al. | Aug. 15, 1950 |
| 2,641,238 | Roosa | June 9, 1953 |
| 2,660,992 | Roosa | Dec. 1, 1953 |